(12) United States Patent
Binek et al.

(10) Patent No.: US 10,782,245 B2
(45) Date of Patent: Sep. 22, 2020

(54) ADDITIVELY MANUFACTURED HEALTH MONITORING FEATURES

(71) Applicant: United Technologies Corporation, Farmington, CT (US)

(72) Inventors: Lawrence Binek, Glastonbury, CT (US); Aaron T. Nardi, East Granby, CT (US)

(73) Assignee: United Technologies Corporation, Farmington, CT (US)

( * ) Notice: Subject to any disclaimer, the term of this patent is extended or adjusted under 35 U.S.C. 154(b) by 130 days.

(21) Appl. No.: 16/047,957

(22) Filed: Jul. 27, 2018

(65) Prior Publication Data

US 2020/0033269 A1 Jan. 30, 2020

(51) Int. Cl.
*G01N 21/88* (2006.01)
*B05B 7/14* (2006.01)
(Continued)

(52) U.S. Cl.
CPC ....... *G01N 21/8851* (2013.01); *B05B 7/1486* (2013.01); *B05D 1/12* (2013.01);
(Continued)

(58) Field of Classification Search
CPC ........ G01N 21/8851; G01N 2021/8887; B05B 7/1486; B05D 1/12; C23C 24/04; B33Y 50/02; B33Y 40/00; B33Y 10/00
See application file for complete search history.

(56) References Cited

U.S. PATENT DOCUMENTS 4,639,997 A 2/1987 Brull
5,154,793 A * 10/1992 Wojnarowski ...... B29C 63/0013
156/229
(Continued)

FOREIGN PATENT DOCUMENTS

CN 104865139 A * 8/2015
JP 2007245105 A 9/2007
JP 2016050352 A 4/2016

OTHER PUBLICATIONS

"Gas dynamic cold spray", from <https://en.wikipedia.org/w/index.php?title=Gas_dynamic_cold_spray&oldid=83826080"2>, page last edited Apr. 25, 2018.
(Continued)

*Primary Examiner* — Thomas C Lee
*Assistant Examiner* — Michael Tang
(74) *Attorney, Agent, or Firm* — Kinney & Lange, P.A.

(57) ABSTRACT

A health monitoring system for monitoring a lifecycle of an additively manufactured component having a microcrystalline structure that can be subjected to a cyclic operational stress is disclosed. The health monitoring system includes a plurality of additively manufactured health monitoring coupons disposed on the component in a representative position that is subjected to the cyclic operational stress, with the health monitoring coupons configured to be individually removable from the health monitoring system by precision machining. A lifecycle monitoring method includes the steps of monitoring one or more operational parameters of the additively manufactured component, calculating a sample trigger, removing a health monitoring coupon by a precision machining process based on the sample trigger, analyzing the health monitoring coupon by an inspection process, determining whether the additively manufactured component is usable and if so, resuming operating the additively (Continued)

manufactured component, otherwise replacing the additively manufactured component.

7 Claims, 3 Drawing Sheets

(51) Int. Cl.
    *B05D 1/12*     (2006.01)
    *C23C 24/04*     (2006.01)
    *B33Y 10/00*     (2015.01)
    *B33Y 40/00*     (2020.01)
    *B33Y 50/02*     (2015.01)

(52) U.S. Cl.
    CPC ............. *C23C 24/04* (2013.01); *B33Y 10/00* (2014.12); *B33Y 40/00* (2014.12); *B33Y 50/02* (2014.12); *G01N 2021/8887* (2013.01)

(56) References Cited

U.S. PATENT DOCUMENTS

| | | | |
|---|---|---|---|
| 6,352,406 | B1 | 3/2002 | Clare et al. |
| 2004/0082069 | A1 | 4/2004 | Jiang et al. |
| 2006/0111871 | A1* | 5/2006 | Winston ................. G06Q 10/06 702/184 |
| 2010/0064819 | A1* | 3/2010 | Oudovikine ........... G01B 11/16 73/810 |
| 2015/0177158 | A1 | 6/2015 | Cheverton |
| 2016/0003158 | A1* | 1/2016 | Ott ........................... F23N 1/00 239/5 |
| 2017/0284914 | A1 | 10/2017 | Johnson |
| 2018/0126499 | A1* | 5/2018 | Eminoglu ............... B23P 6/005 |
| 2018/0202957 | A1* | 7/2018 | Benoit ................. G01N 15/082 |
| 2018/0247277 | A1* | 8/2018 | Livernois ............... G06Q 10/20 |

OTHER PUBLICATIONS

D. Novichinko, et al., "Metal Matrix Composite Material by Direct Metal Deposition", from Physics Procedia 12 (2011), pp. 296-302.

A. Moridi, et al., Cold spray coating: review of material systems and future perspectives:, from Surface Engineering 2014, vol. 36, No. 6, pp. 369-395.

W. E. King, "Laser powder bed fusion additive manufacturing of metals; physics, computational, and materials challenges", from American Institute of Physics, 2015, 27 pages.

Extended European Search Report dated Jan. 2, 2020, for corresponding European Application No. 19188498.3.

\* cited by examiner

ADDITIVELY MANUFACTURED HEALTH MONITORING FEATURES

BACKGROUND

Gas dynamic cold spray is a coating deposition method whereby solid powders of metals, polymers, ceramics, composite materials, and/or nanocrystalline powders are accelerated in a hot gas jet to hypersonic velocities and directed at a target substrate where they undergo plastic deformation and adhere to the substrate surface. Gas dynamic cold spray is also called cold spray (CS) because the powders are not melted during the spraying process. Cold spray is an additive manufacturing process that can be used to manufacture, repair, or refinish a wide variety of components in many industries, including the aerospace industry. Cold spray additive manufacturing typically utilizes a cold spray gun which receives a hot pressurized working gas and a supply of solid powder, with the solid powder being accelerated by the working gas through a nozzle to be directed at a target. Moreover, a cold spray gun can operate intermittently, meaning that cyclic thermal and pressure stress can be induced in the structural components of the cold spray gun.

A cold spray gun can itself be additively manufactured by using a direct metal deposition process to form the intricate internal passages that are used in a cold spray gun, while also having the material properties that enable many operating cycles of use. However, over the operating lifetime of a cold spray gun, cyclic stress loading can degrade the microcrystalline structure of the cold spray gun material, eventually leading to material failure. It is desirable to condemn a cold spray gun prior to it reaching a point of catastrophic material failure during operation. On the other hand, because of the cost of a cold spray gun, it is desirable to extract a maximum useful operating lifetime from it. Therefore, it is desirable to have a means of monitoring the health of an additively manufactured cold spray gun in order to maximize its service life.

SUMMARY

A health monitoring system for monitoring a lifecycle of an additively manufactured component having a microcrystalline structure that can be subjected to a cyclic operational stress, whereby the health monitoring system includes a plurality of additively manufactured health monitoring coupons disposed on the component in a representative position that is subjected to the cyclic operational stress, where the health monitoring coupons are each configured to be individually removable from the health monitoring system by precision machining.

A method for monitoring a lifecycle of an additively manufactured component having a microcrystalline structure that can be subjected to a cyclic operational stress includes the steps of monitoring one or more operational parameters of the additively manufactured component, calculating a sample trigger based on the monitoring, removing a health monitoring coupon in response to the sample trigger by a precision machining process, analyzing the health monitoring coupon by an inspection process, determining whether the additively manufactured component is usable based on the analysis of the health monitoring coupon, resuming operating the additively manufactured component and continuing monitoring the one or more operational parameters if the additively manufactured component is usable, and replacing the additively manufactured component if the additively manufactured component is not usable.

DETAILED DESCRIPTION

A cold spray gun can itself be additively manufactured by using a direct metal deposition (DMD) process, thereby forming the intricate internal passages that are used in a cold spray gun. Laser powder bed fusion can typically be used as the DMD process to fabricate a cold spray gun, with the resulting material being a metal matrix composite (MMC) having a microcrystalline material structure. Non-limiting examples of materials that can be used to form the MMC include metals, metal alloys, and/or mixtures of metals, metal oxides, ceramics, fibers, and other materials.

After being fabricated, the cold spray gun can have material properties that enable many operating cycles of use. However, over the operating lifetime of a cold spray gun, the cyclic stress loading can degrade the microstructure of the cold spray gun material, eventually leading to material failure. It is desirable to condemn a cold spray gun prior to it reaching a point of catastrophic material failure during operation. On the other hand, because of the cost of a cold spray gun, it is desirable to extract a maximum useful operating lifetime from it. Because laser powder bed fusion and other related processes of additive manufacturing are developing technologies, the material properties of the microcrystalline material structure are not well understood. In particular, it is difficult to predict with accuracy the serviceable lifetime of a cold spray gun when subjected to cyclic temperature and pressure stresses over time.

The present disclosure provides a health monitoring system for an additively manufactured component having a microcrystalline material structure that is subject to cyclic stress loading. The features of the health monitoring system are depicted on a cold spray gun as an exemplary embodiment of an additively manufactured microcrystalline material structure that is subject to cyclic stress loading. All embodiments of health monitoring system features on additively manufactured microcrystalline material structures are within the scope of the present disclosure.

Figure 1A:
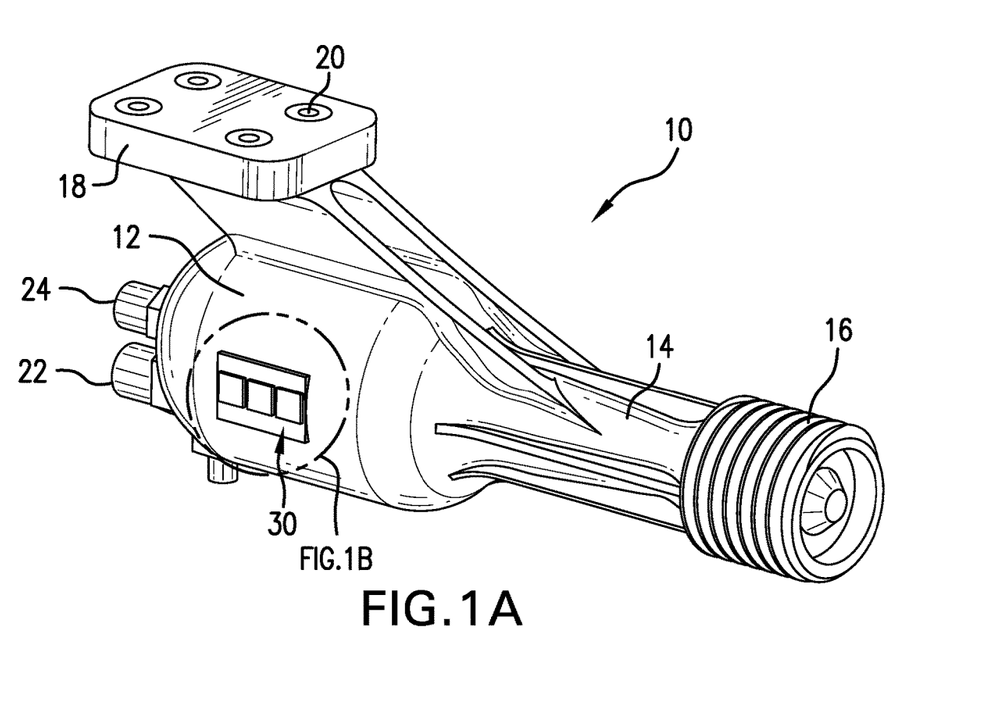
FIG. 1A is a perspective view of a cold spray gun showing the health monitoring system.
Figures 1B, 1C:
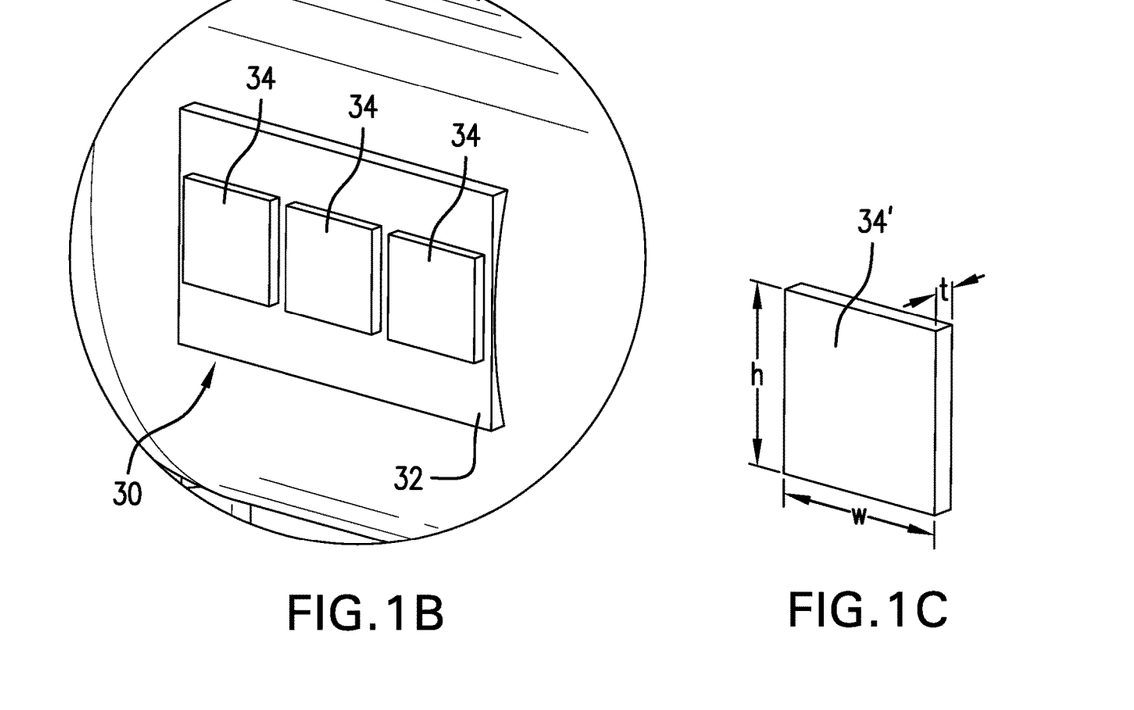
FIG. 1B is an enlarged perspective view of the health monitoring system shown in FIG. 1A.
FIG. 1C is a perspective view of a removed health monitoring coupon shown in FIG. 2B.

FIG. 1A is a perspective view of an additively manufactured cold spray gun showing the health monitoring system. FIG. 1B is an enlarged perspective view of health monitoring system 30 in FIG. 1A. FIG. 1C is a perspective view of a removed health monitoring coupon 34' from FIG. 1B. Shown in FIGS. 1A-1C are cold spray gun 10, gun barrel 12, gun neck 14, nozzle connector 16, mounting flange 18, flange apertures 20, gas inlet port 22, material inlet port 24, health monitoring feature 30, flat base 32, health monitoring coupons 34, and health monitoring coupon 34'. Cold spray gun 10 has been additively manufactured by using a DMD process, and includes gun barrel 12, gun neck 14, nozzle connector 16, and mounting flange 18. During the operation of cold spray gun 10, gas inlet port 22 receives a hot pressurized working gas (not shown), and material inlet port 24 receives a supply of solid powder (not shown). During operation, the temperature and pressure of the hot pressurized working fluid can approach 500 deg. C. (932 deg. F.) and 1,725 KPa (250 psi), respectively. During operation, the solid powder is entrained in the hot pressurized working gas in the interior of gun barrel 12 and accelerated to a hypersonic velocity within the interior of gun neck 14. The velocity of accelerated solid powder can reach 1,000 m/s (2,237 miles/hr). When not being operated, cold spray gun 10 can cool to ambient temperature. An exemplary ambient temperature is 21 deg. C. (70 deg. F.). Accordingly, in the illustrated embodiment, the temperature range, which is defined as the difference between the maximum and minimum temperature of cold spray gun 10, can be 430 deg. C. (774 deg. F.). Similarly, in the illustrated embodiment, the pressure range, which is defined as the difference between the maximum and minimum pressure of cold spray gun 10, can be 1,725 KPa (250 psi). In other embodiments, the temperature range can be between 100 deg. C. (180 deg. F.)-500 deg. C. (900 deg. F.), and the pressure range can be between 650 KPa (94 psi)-3,000 KPa (435 psi).

During operation, a nozzle (not shown) is attached to cold spray gun 10 by means of nozzle connector 16, thereby allowing the accelerated solid powder to be directed at a target (not shown). In the illustrated embodiment, nozzle connector 16 is threaded, thereby allowing a nozzle to be threadably connected to cold spray gun 10. A benefit of threadably attaching a nozzle to nozzle connector 16 is to allow for the repeated removal and reattachment of the nozzle. Cold spray gun 10 is held in position by affixing mounting flange 18 to a suitable fixture (not shown). Flange apertures 20 allow threaded fasteners (not shown) to be used to affix mounting flange 18 to the suitable fixture. A benefit of threadably attaching mounting flange 18 to a suitable fixture is to allow for the repeated removal and reattachment of cold spray gun 10. In an embodiment, for example, the suitable fixture can be a robotic arm (not shown) that is used to maneuver cold spray gun 10 in the vicinity of the target. In an exemplary embodiment, the hot pressurized working gas can be helium. In other embodiments, the hot pressurized working gas can be any other gas, or a mixture of gasses that can include helium, argon, and/or nitrogen. In an exemplary embodiment, the solid powder can be metals, alloys, polymers, ceramics, composite materials, and nanocrystalline materials.

During operation of cold spray gun 10, the interior of gun barrel 12 experiences the temperature and pressure of the hot pressurized working gas. During operation, gun barrel 12 functions as a pressure vessel to contain the hot pressurized working gas. In the illustrated embodiment, gun barrel 12 has the greatest circumferential dimension of cold spray gun 10 and can therefore experience the greatest tensile pressure stress loading from the hot pressurized working gas. Moreover, because gun barrel 12 functions as a pressure vessel, it must have a wall thickness that is sufficient to endure the tensile pressure stress loading during operation. Accordingly, during heat-up at the beginning of operation from ambient temperature to that of the hot pressurized working gas, and during cool-down following operation, gun barrel 16 can experience thermal stress loading from the heat-up rate and cool-down rate. The thermal stress profile can include regions that are under tensile stress, compressive stress, or both. Therefore, the microcrystalline material structure of gun barrel 12 can be susceptible to the greatest stress loading experienced by cold spray gun 10, and it can therefore experience the greatest material degradation over the lifecycle of cold spray gun 10. Over the lifetime of cold spray gun 10, the material degradation can lead to material failure. In an extreme case, catastrophic failure can occur, possibly resulting in damage to other components.

The physical dimensions of cold spray gun 10 can vary widely. For example, in a typical embodiment, cold spray gun 10 can have a length (not labeled) of approximately 20 cm (8 in), and gun barrel 12 can have a diameter (not labeled) of approximately 7.5 cm (3 in). In other embodiments, cold spray gun 10 can have sizes that are greater than or less than the aforementioned exemplary dimensions. Moreover, in other embodiments, cold spray gun 10 can have shapes and features that are different from the exemplary shape depicted in FIG. 1A.

Referring again to FIG. 1A, health monitoring feature 30 is located on the outer surface of gun barrel 12. Health monitoring feature 30 is manufactured integrally with cold spray gun 10 by means of a DMD process described earlier, and is therefore made of the same material and subject to the same material degradation as gun barrel 12 (and accordingly, as cold spray gun 10). In the illustrated embodiment, cold spray gun 10 has been additively manufactured using laser powder bed fusion, thereby resulting in a microcrystalline material structure. In other embodiments, cold spray gun 10 can be additively manufactured using other DMD processes that result in a microcrystalline material structure.

Referring to FIG. 1B, health monitoring system 30 includes flat base 32 and one or more health monitoring coupons 34. Flat base 32 is a transition region between the curved outer profile of gun barrel 12 and health monitoring coupons 34. Accordingly, health monitoring coupons 34 are built out as planar elements from flat base 32. In the illustrated embodiment, three health monitoring coupons are included in health monitoring system 30. In some embodiments, fewer than three health monitoring coupons 34 can be included in health monitoring system 30. In other embodiments, more than three health monitoring coupons 34 can be included in health monitoring system 30. In yet other embodiments, health monitoring system 30 can omit flat base 32. In these other embodiments, health monitoring system 30 can consist only of one or more health monitoring coupons 34.

In the illustrated embodiment, health monitoring system 30 is located on a first region of gun barrel 12. In other embodiments, a second health monitoring system 30 can be located on a second region of gun barrel 12. For example, in one of these other embodiments, a second health monitoring system 30 can be located on the opposite (or distal) side of gun barrel 12 from the first health monitoring system 30 shown in FIG. 1A. In yet other embodiments, a health monitoring system 30 can be included on any region of cold spray gun 10. An advantage of including more than three health monitoring coupons 34 in health monitoring system 30, and/or of including more than one health monitoring system 30 on cold spray gun 10, can be to provide a higher resolution of data in monitoring the lifecycle of cold spray gun 10. That is, by providing a greater total number of health monitoring coupons 34 on cold spray gun 10, successive health monitoring coupons 34 can be analyzed at a more frequent interval throughout the service life of cold spray gun 10. Accordingly, there is no firm upper limit to the number of health monitoring coupons 34 that can be located on an additively manufactured component.

As described above, health monitoring feature 30 is subjected to transient and operational pressure and temperature stresses throughout the lifecycle of cold spray gun 10.

Therefore, health monitoring system 30 can experience the same material degradation of its microcrystalline material structure as cold spray gun 10. Various inspection methods can be used to assess the existence, and if so, the extent of changes in the microcrystalline material structure of health monitoring system 30 over the operational lifetime of cold spray gun 10. Inspecting or analyzing microcrystalline material structural changes in health monitoring coupon 34 of health monitoring system 30 can therefore provide an indication of the health of cold spray gun 10. These inspections can be used to determine when cold spray gun 10 should be condemned, thereby removing it from service prior to reaching the point of material failure.

Health monitoring coupon 34 can be removed from health monitoring system 30 for inspection and analysis of its microcrystalline material structural to determine the extent of changes which may have occurred. In the illustrated embodiment, three health monitoring coupons 34 are available for removal and analysis during the service life of cold spray gun 10. As will be described in FIG. 3, an algorithm can be used to determine when a first health monitoring coupon 34 is to be removed, and when subsequent health monitoring coupons 34 are to be removed. Several factors can be considered in making this determination, with non-limiting examples of these factors including the operating parameter history of cold spray gun 10. For the sake of the present description, a determination has been made at a particular point in the service life of cold spray gun 10 to remove a health monitoring coupon 34 for analysis. In the illustrated embodiment, a first (or successive) health monitoring coupon 34 is removed from cold spray gun 10 by electrical discharge machining (EDM). EDM is a precision machining method that can be used for precisely removing health monitoring coupon 34 from health monitoring system 30. In other embodiments, other precision machining methods can be used to remove health monitoring coupon 34 from health monitoring system 30. For example, non-limiting examples of other precision machining methods include mechanical cutting with a band saw and laser cutting with a laser beam. As can be seen in FIG. 1B, flat base 32 provides a planar datum that is used for removing health monitoring coupon 34.

Referring to FIG. 1C, health monitoring coupon 34' is labeled with dimensions of width w, height h, and thickness t. In an exemplary embodiment, health monitoring coupon 34' can have a width w and height h of about 1.25 cm (0.49 in) each. In some embodiments, width w and height h can be between 0.5 cm (0.2 in)-2 cm (0.8 in) each. In other embodiments, width w and height h can be different from each other, and either width w and/or height h can be less than 0.5 cm (0.2 in) or greater than 2 cm (0.8 in). In other embodiments, health monitoring coupons 34 can have any geometric shape other than rectangular (and therefore, other than square). Accordingly, health monitoring coupon 34' (after being removed from health monitoring feature 30) can have any geometric shape.

In an exemplary embodiment, health monitoring coupon 34' can have a thickness t between approximately 0.76 mm (0.03 in)-1.02 mm (0.04 in). In a particular embodiment, thickness t can be about 0.9 mm (0.035 in). In other embodiments, thickness t can be less than 0.76 mm (0.03 in) or greater than 1.02 mm (0.04 in). In yet other embodiments, health monitoring coupon 34' can have a non-uniform thickness t. In these other embodiments, non-uniform thickness t can result from either intentionally or unintentionally using a precision machining process that results in non-uniform thickness t. For example, it can be possible that during the removal of health monitoring coupon 34' the EDM plane is not parallel to flat base 32. Accordingly, health monitoring coupon 34' can have a non-uniform thickness t.

In an exemplary embodiment, once a triggering event occurs to prompt a user to remove a first health monitoring coupon 34, cold spray gun 10 would first be shut down and removed from the fixture as described above in FIG. 1A. Health monitoring coupon 34' would then be inspected and/or analyzed for indications of change to the microcrystalline material structure. The results of the inspection and/or analysis of health monitoring coupon 34' can be used to determine the extent of changes to the microcrystalline material structure of cold spray gun 10, because health monitoring coupon 34' provides a representative sample of the material of cold spray gun 10, as described above in FIG. 1A. Accordingly, the results of the inspection and/or analysis of health monitoring coupon 34' can help a user determine whether cold spray gun 10 is in a serviceable condition or should be condemned. If cold spray gun 10 is deemed to be in a serviceable condition, cold spray gun 10 can be returned to operation. The results of the inspection and/or analysis of health monitoring coupon 34' can be included as a factor, in addition to the monitoring of operating parameters, in determining when the next health monitoring coupon 34 should be removed. The foregoing description of removing health monitoring coupon 34 is predicated on being able to support cold spray gun 10 in a suitable machining position for performing a suitable precision machining method for removing health monitoring coupon 34. In the illustrated embodiment, the removal of cold spray gun 10 from the cold spray system (not shown) is required in order to remove health monitoring coupon 34. In other embodiments, health monitoring coupon could be removed in situ by bringing the EDM equipment to the operating location of cold spray gun 10.

Various inspection and analysis techniques can be used on health monitoring coupon 34' to determine the extent of changes to the microcrystalline material structure. For example, a visual inspection can be performed to determine if there are any visually observable cracks in health monitoring coupon 34'. A visual inspection can be performed with or without magnification. A liquid dye penetrant test can be performed, which can provide an indication of micro-cracks in health monitoring coupon 34'. Radiologic computed tomographic (CT) imaging, X-ray imaging, and/or X-ray diffraction imaging can be performed to provide an indication of the internal structure of health monitoring coupon 34'. Other nondestructive and/or destructive testing methods can be performed on health monitoring coupon 34', with non-limiting examples including eddy current testing, magnetic particle testing, ultrasonic testing, fracture toughness testing, and yield strength testing. Any form of inspection, analysis, and testing on health monitoring coupon 34' to determine the existence and scope of changes to the microcrystalline material structure is within the scope of the present disclosure.

On the other hand, if the results of the inspection and/or analysis of health monitoring coupon 34' determine that cold spray gun 10 should be condemned and removed from service, a new cold spray gun 10 can be installed and used. The condemnation of cold spray gun 10 therefore allows cold spray gun 10 to undergo additional testing, including destructive testing. For example, hydrostatic pressure testing could be performed on cold spray gun 10. Moreover, cold spray gun 10, or particularly, gun barrel 12, could be cross-sectioned thereby allowing for inspection of the interior microcrystalline structure. Collectively, these analysis techniques can be referred to as failure analysis. The results of the failure analysis on cold spray gun 10 can be used to determine future inspection intervals for health monitoring coupons 34 on subsequently installed cold spray guns 10.

Figure 2:
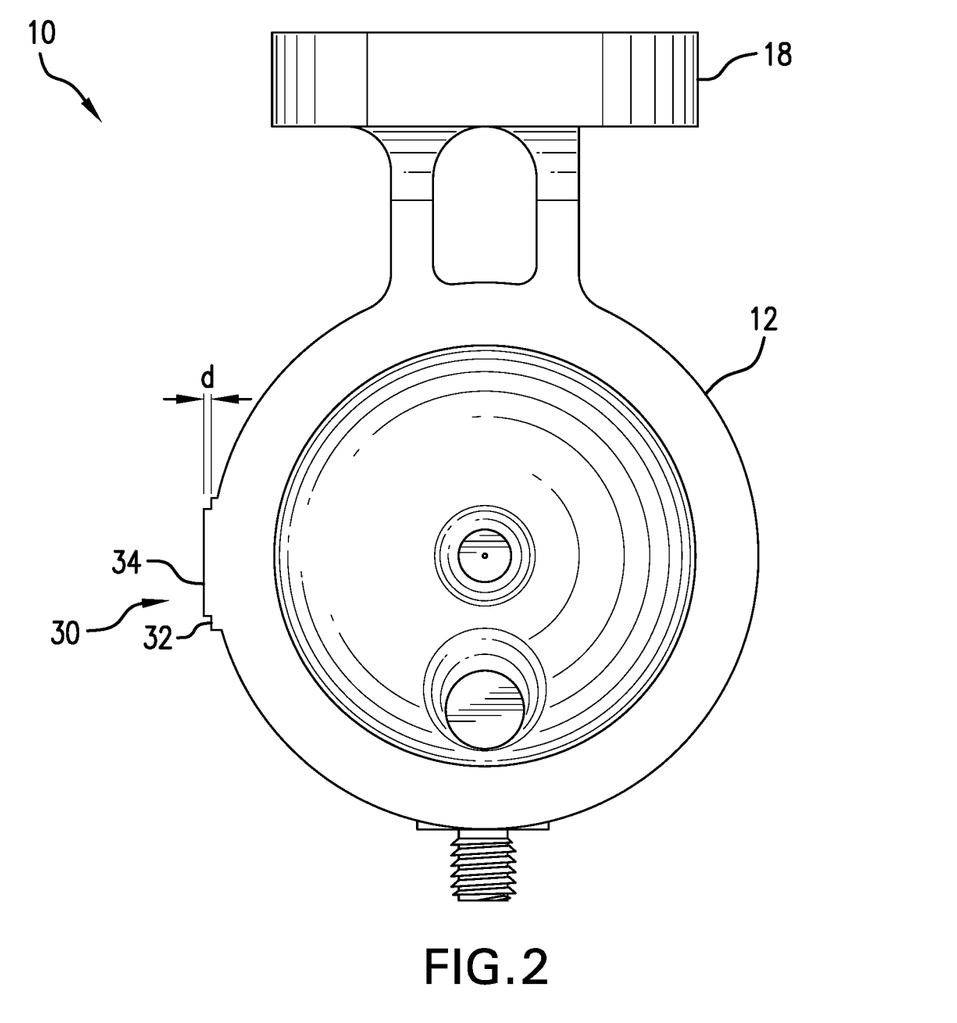
FIG. 2 is a front end view of the cold spray gun of FIG. 1A.

FIG. 2 is a front end view of cold spray gun 10 of FIG. 1A. Shown in FIG. 2 are cold spray gun 10, gun barrel 12, mounting flange 18, health monitoring system 30, flat base 32, and health monitoring coupon 34. The description of cold spray gun 10, gun barrel 12, mounting flange 18, health monitoring system 30, flat base 32, and health monitoring coupon 34 are as provided in FIGS. 1A-1B. Health monitoring coupon 34 protrudes outward from flat base 32 by distance d. In an exemplary embodiment, distance d can be between approximately 0.9 mm (0.035 in)-1.15 mm (0.045 in). In a particular embodiment, distance d can be about 1.02 mm (0.04 in). In other embodiments, distance d can be less than 0.9 mm (0.035 in) or greater than 1.15 mm (0.045 in). It is to be appreciated that the precision machining method that was described in FIG. 1C removes some amount of material in its process. Therefore, distance d will generally be greater than thickness t as described in FIG. 1C. For example, in an exemplary embodiment, EDM uses a wire that is about 0.13 mm (0.005 in) in diameter. Therefore, in this exemplary embodiment, distance d can be about 0.13 mm (0.005 in) greater than thickness t as shown in FIG. 1C.

In the embodiment illustrated in FIG. 2, cold spray gun 10 includes a single health monitoring feature 30. In other embodiments, cold spray gun 10 can include two or more health monitoring features 30. For example, in one of these other embodiments, a second health monitoring feature 30 could be located on the side of gun barrel 12 that is opposite a first health monitoring system 30. In other embodiments, a second, third, or more health monitoring feature could be located anywhere on cold spray gun 10. In some of these embodiments, all health monitoring features 30 could be similar to each other. In other embodiments, at least one health monitoring feature 30 could be different from another health monitoring feature 30. These differences could include any of the following: the number of health monitoring coupons 34, the width w, height h, and/or distance d of health monitoring coupons 34, and the geometric shape of health monitoring coupons 34.

Figure 3:
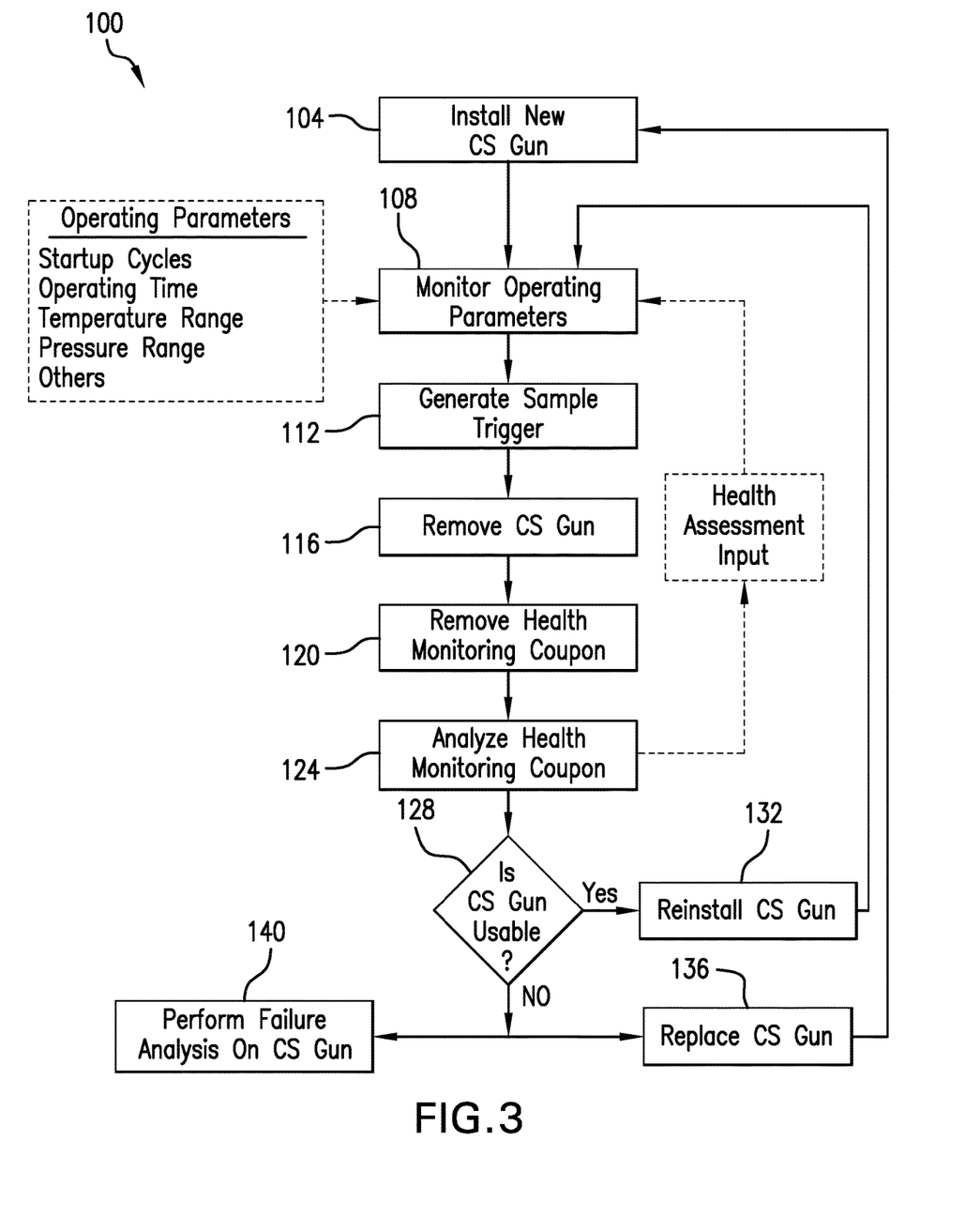
FIG. 3 is a flowchart diagram depicting the health monitoring lifecycle.

FIG. 3 is a flowchart diagram depicting the health monitoring lifecycle of cold spray (CS) gun 10 in FIG. 1A. Shown in FIG. 3 are health monitoring lifecycle 100, and the following steps: install new CS gun step 104, monitor operating parameters step 108, generate sample trigger step 112, remove CS gun step 116, remove health monitoring coupon step 120, analyze health monitoring coupon step 124, make CS gun usability decision 128, reinstall CS gun step 132, replace CS gun step 136, and perform failure analysis on CS gun step 140. In the illustrated embodiment, health monitoring lifecycle 100 begins with install new CS gun step 104, depicting the installation of a new cold spray gun 10 in a cold spray manufacturing, repair, or refinishing system (not shown). As cold spray 10 gun operates, various operating parameters are monitored in monitor operating parameters step 108. In the illustrated embodiment, the various operating parameters that are monitored include the number of startup cycles (and accordingly, the number of shutdown cycles), the operating time for each operating cycle, the temperature range for each operating cycle, and the pressure range for each operating cycle. In some embodiments, fewer than these enumerated operating parameters can be monitored. For example, in some embodiments, it can be sufficient to monitor only the cumulative operating time of cold spray gun 10. In other embodiments, additional operating parameters can be monitored. Non-limiting examples of additional operating parameters can include the rate of pressurization and depressurization of cold spray gun 10, the heat-up and cool-down rates of cold spray gun 10, the type of working gas used in cold spray gun 10, and the size and composition of the powder used in cold spray gun 10.

Generate sample trigger step 112 receives input from monitor operating parameters step 108 to determine when the operator should remove a health monitoring coupon 34. In the illustrated embodiment, monitoring operating parameters step 108 receives a continuous input of the various operating parameters, and an algorithm calculates when a sample trigger should be generated. In other embodiments, monitoring operating parameters step 108 can intermittently receive inputs of the various operating parameters for calculating when the sample trigger should occur. In some of these other embodiments, some operating parameters can be sampled at frequencies that are different than other operating parameters.

Referring back to FIG. 3, upon receiving the trigger alert from generate sample trigger step 112, remove CS gun step 116 directs the operator to shut down and remove cold spray gun 10 from the cold spray system. In the illustrated embodiment, remove CS gun step 116 can be performed at the next convenient opportunity, for example, at the end of a cold spray cycle or following the completion of a work shift. After completing remove CS gun step 116, remove health monitoring coupon step 120 directs the operator to remove a first health monitoring coupon 34 from health monitoring system 30. After being removed from health monitoring system 30, health monitoring coupon 34' can be evaluated for indications of change to the microcrystalline material structure. Analyze health monitoring coupon step 124 directs the operator to inspect, analyze, and/or evaluate health monitoring coupon 34' as described above in FIG. 1C. The results of this analysis are used to determine the fate of cold spray gun 10. Make CS gun usability decision 128 provides a yes/no decision on whether cold spray gun 10 can continue to be used in operation. If cold spray gun 10 is deemed to be usable, reinstall CS gun step 132 directs the operator to re-install cold spray gun 10. Additionally, the analysis results can be provided as a health assessment input to monitor operating parameters step 108. After completing reinstall CS gun step 132, monitor operating parameters step 108 resumes. In some embodiments, health monitoring coupon 34 can be removed from cold spray gun 10 in situ, without first removing and subsequently reinstalling cold spray gun 10 from the cold spray system. In these embodiments, remove CS gun step 116 and reinstall CS gun step 132 can be omitted.

On the other hand, if cold spray gun 10 is not deemed to be usable, then cold spray gun 10 must be condemned. Accordingly, replace CS gun step 136 directs the operator to install a new cold spray gun 10 in the cold spray system. After replace CS gun step 136 is performed, monitor operating parameters step 108 resumes. Finally, the condemned cold spray gun 10 can be subjected to further testing and analysis. Perform failure analysis on CS gun step 140 directs the operator to perform additional analysis on cold spray gun 10, as described above in FIG. 1C. Moreover, the data obtained in health monitoring lifecycle 100 can be used to optimize future health monitoring lifecycles 100 for subsequent cold spray guns 10, and in particular, to optimize monitor operating parameters step 108 for optimally determining when to remove health monitoring coupons 34 in generate sample trigger step 112. In the illustrated embodiment, perform failure analysis on CS gun step 140 is typically performed at the end of life of cold spray gun 10. In other embodiments, perform failure analysis on CS gun step 140 is an optional step that is not necessary to be performed following the condemnation of every cold spray gun 10. For example, perform failure analysis on CS gun step 140 can be beneficial when cold spray gun 10 has a different size or shape, is manufactured from a different composition, and/or has operated under different operating parameters than previous cold spray guns 10.

In the illustrated embodiment, health monitoring lifecycle 100 is unique for each particular embodiment of cold spray gun 10. For example, if health monitoring system 30 includes a greater number of health monitoring coupons 34 than in the illustrated embodiment, and/or if cold spray gun 10 includes more than one health monitoring system 30 as in the illustrated embodiment, then generate sample trigger step 112 can be programmed to trigger at a greater frequency. Further, health monitoring lifecycle 100 can be different for a different design of cold spray gun 10, with differences being determined based of size, shape, style, and/or the type of MMC, and therefore the microcrystalline material structural, that is used in cold spray gun 10. Moreover, as noted earlier, health monitoring system 30 of the present disclosure can be used on any additively manufactured component having a microcrystalline material structure that is subject to cyclic stress loading. Accordingly, in these other embodiments, health monitoring lifecycle 100 can be adjusted to accommodate the various components on which health monitoring system 30 is used.

Referring back to FIG. 3, health monitoring lifecycle 100 runs in an electronic computing device in the illustrated embodiment. In terms of hardware architecture, such a computing device can include a processor, a memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The aforementioned processor can be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions. The memory can include any one or combination of volatile memory elements, e.g., random access memory (RAM, such as DRAM, SRAM, SDRAM, VRAM, etc.) and/or nonvolatile memory elements, e.g., ROM, hard drive, tape, CD-ROM, etc. Moreover, the memory may incorporate electronic, magnetic, optical, and/or other types of storage media. Note that the memory can also have a distributed architecture, where various components are situated remotely from one another, but can be accessed by the processor. The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The aforementioned I/O devices that may be coupled to system I/O Interface(s) may include input devices, for example but not limited to, a keyboard, mouse, scanner, microphone, camera, proximity device, etc. Further, the I/O devices may also include output devices, for example but not limited to, a printer, display, etc. Finally, the I/O devices may further include devices that communicate both as inputs and outputs, for instance but not limited to, a modulator/demodulator (modem) for accessing another device, system, or network; a radio frequency (RF) or other transceiver; or a telephonic interface, bridge, router, etc. When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

The afore described implementation of health monitoring lifecycle 100 is predicated on the accurate and continuous monitoring of many complex operating parameters for cold spray gun 10. In other embodiments, a reduced set of operating parameters can be monitored. For example, in some embodiments, the monitoring of only the operating time and/or the number of start-up cycles of cold spray gun 10 can provide sufficiently accurate information from generate sample trigger step 112.

Discussion of Possible Embodiments

The following are non-exclusive descriptions of possible embodiments of the present invention.

A health monitoring system for monitoring a lifecycle of an additively manufactured component having a microcrystalline structure that can be subjected to a cyclic operational stress, the health monitoring system comprising a plurality of additively manufactured health monitoring coupons disposed on the component in a representative position that is subjected to the cyclic operational stress, wherein the health monitoring coupons are each configured to be individually removable from the health monitoring system by precision machining.

The system of the preceding paragraph can optionally include, additionally and/or alternatively, any one or more of the following features, configurations and/or additional components:

A further embodiment of the foregoing system, further comprising a flat base disposed on the additively manufactured component, the flat base supporting the plurality of health monitoring coupons.

A further embodiment of the foregoing system, wherein the plurality of health monitoring coupons comprises three health monitoring coupons.

A further embodiment of the foregoing system, wherein the additively manufactured component is a cold spray gun, and the cold spray gun comprises a microcrystalline structure that can be subjected to a cyclic operational stress.

A further embodiment of the foregoing system, wherein the cyclic operational stress comprises a cyclic temperature stress and a cyclic pressure stress.

A further embodiment of the foregoing system, wherein the cyclic temperature stress comprises a temperature range between 100-500 deg. C., and the cyclic pressure stress comprises a pressure range between 650-3,000 KPa.

A further embodiment of the foregoing system, wherein the cold spray gun comprises a gun barrel having an outer circumferential position, wherein the health monitoring system is disposed on the outer circumferential position.

A further embodiment of the foregoing system, wherein the health monitoring coupon further comprises a width and a height, wherein the width is between 0.2 and 2 cm, and the height is between 0.2 and 2 cm.

A further embodiment of the foregoing system, wherein the width is about 1.25 cm, and the height is about 1.25 cm.

A further embodiment of the foregoing system, wherein the health monitoring coupon further comprises a thickness between 0.78 and 1.02 mm.

A further embodiment of the foregoing system, wherein the precision machining comprises electrical discharge machining.

A further embodiment of the foregoing system, wherein an additively manufactured component having a microcrystalline structure that can be subjected to a cyclic operational stress comprises two or more of the foregoing health monitoring systems.

A method for monitoring a lifecycle of an additively manufactured component having a microcrystalline structure that can be subjected to a cyclic operational stress, the method comprising: monitoring one or more operational parameters of the additively manufactured component; calculating, based on the monitoring, a sample trigger; removing, by a precision machining process, a health monitoring coupon in response to the sample trigger; analyzing, by an inspection process, the health monitoring coupon; determining whether the additively manufactured component is usable based on the analysis of the health monitoring coupon; resuming operating the additively manufactured component and continuing monitoring the one or more operational parameters if the additively manufactured component is usable; and replacing the additively manufactured component if the additively manufactured component is not usable.

The system of the preceding paragraph can optionally include, additionally and/or alternatively, any one or more of the following features, configurations and/or additional components:

A further embodiment of the foregoing method, wherein the one or more operational parameters of the additively manufactured component is selected from the group consisting of: number of startup cycles, operational time, operational temperature range, and operational pressure range.

A further embodiment of the foregoing method, wherein the precision machining process comprises electrical discharge machining.

A further embodiment of the foregoing method, wherein the inspection process comprises radiologic computed tomographic imaging.

A further embodiment of the foregoing method, wherein the inspection process is selected from the group consisting of: visual inspection, microscopic inspection, liquid dye penetrant testing, X-ray imaging, scanning electron microscopic imaging, X-ray diffraction imaging, eddy current testing, magnetic particle testing, and ultrasonic testing.

A further embodiment of the foregoing method, further comprising performing failure analysis on the additively manufactured component if the additively manufactured component is not usable.

A further embodiment of the foregoing method, wherein the additively manufactured component is a cold spray gun.

A further embodiment of the foregoing method, wherein the steps of monitoring the one or more operational parameters of the additively manufactured component and calculating the sample trigger are performed by one or more processors and computer-readable memory encoded with instructions that, when executed by the one or more processors, perform the steps of monitoring the one or more operational parameters of the additively manufactured component and calculating the sample trigger.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for monitoring a lifecycle of an additively manufactured component having a microcrystalline structure that can be subjected to a cyclic operational stress, the additively manufactured component having a plurality of additively manufactured health monitoring coupons disposed on the component in a representative position that is subjected to the cyclic operational stress, each of the plurality of health monitoring coupons additively manufactured integrally with the additively manufactured component and configured to be individually removable from the health monitoring system by precision machining, the method comprising:

monitoring one or more operational parameters of the additively manufactured component, wherein the one or more operational parameters is selected from the group consisting of: number of startup cycles, operational time, operational temperature range, and operational pressure range;

calculating, based on the monitoring, a sample trigger;

removing, by a precision machining process, one of the plurality of additively manufactured health monitoring coupons in response to the sample trigger;

analyzing, by an inspection process, the one of the plurality of additively manufactured health monitoring coupons;

determining whether the additively manufactured component is usable based on the analysis of the one of the plurality of additively manufactured health monitoring coupons;

resuming operating the additively manufactured component and continuing monitoring the one or more operational parameters if the additively manufactured component is usable; and replacing the additively manufactured component if the additively manufactured component is not usable.

2. The method of claim 1, wherein the precision machining process comprises electrical discharge machining.

3. The method of claim 1, wherein the inspection process comprises radiologic computed tomographic imaging.

4. The method of claim 1, wherein the inspection process is selected from the group consisting of: visual inspection, microscopic inspection, liquid dye penetrant testing, X-ray imaging, scanning electron microscopic imaging, X-ray diffraction imaging, eddy current testing, magnetic particle testing, and ultrasonic testing.

5. The method of claim 1, further comprising performing failure analysis on the additively manufactured component if the additively manufactured component is not usable.

6. The method of claim 1, wherein the additively manufactured component is a cold spray gun.

7. The method of claim 1, wherein the steps of monitoring the one or more operational parameters of the additively manufactured component and calculating the sample trigger are performed by:
- one or more processors; and
- computer-readable memory encoded with instructions that, when executed by the one or more processors, perform the steps of monitoring the one or more operational parameters of the additively manufactured component and calculating the sample trigger.

* * * * *